Patented Sept. 4, 1945

2,384,315

UNITED STATES PATENT OFFICE 2,384,315

PROCESS FOR CRACKING CRUDE HYDROCARBON OIL

Paul E. Kuhl, Madison, N. J., assignor to Standard Oil Development Company, a corporation of Delaware No Drawing. Application August 6, 1942, Serial No. 453,805

7 Claims. (Cl. 196—44)

This invention relates to the catalytic conversion of hydrocarbon oils and pertains more particularly to a method of pretreating the oil to remove impurities therefrom prior to subjecting the same to catalytic cracking treatment.

It has been known heretofore that certain types of hydrocarbon oils are less suitable for catalytic cracking than others. One explanation is that hydrocarbon oils derived from some crudes contain certain impurities which tend to poison the catalyst or adversely affect the cracking activity thereof.

It has now been discovered that oils containing nitrogen bases are less suitable for cracking in the presence of active catalysts than oils which are relatively free of such bases. For example, an East Texas gas oil was cracked at a temperature of about 844° F. in the presence of an active catalyst to form 32.4% gasoline. About 0.2% nitrogen in the form of pyridine was then added to the same oil. When cracking the oil containing the pyridine in the presence of the same catalyst and under the same conditions, the yield of gasoline was reduced to 28.1%.

As a further example, a gas oil derived from Mirando crude was cracked in the presence of a catalyst to form 32% gasoline. After adding 0.2% nitrogen in the form of pyridine, a yield of only 25.0% gasoline was obtained under the same cracking conditions employing the same catalyst. Furthermore, it has been found that the presence of nitrogen bases such as pyridine or pyridine derivatives materially increases the acid heat of the gasoline formed. In the case of the East Texas gas oil above mentioned, the acid heat of the gasoline by cracking of this oil without the addition of pyridine was 53, whereas the addition of pyridine in the amount above mentioned increased the acid heat of the gasoline to 64. In case of the Mirando gas oil, the addition of 0.2% nitrogen as pyridine increased the acid heat from 46 to 59.

From the above it is evident that the presence of nitrogen in the oil to be cracked, and particularly nitrogen in the form of nitrogen bases such as pyridine and derivatives thereof, reduces the quality and quantity of gasoline obtained by catalytic cracking under a given set of cracking conditions.

The principal object of the present invention is to provide a method of improving the cracking characteristics of oils containing nitrogen bases. Another object of the invention is to provide an improved method of removing nitrogen base impurities from hydrocarbon oils to be treated in the presence of a catalyst.

Other specific objects of the invention will become apparent from the more detailed description hereinafter.

I have found that the cracking characteristics of oils initially containing nitrogen impurities may be improved by initially treating the oil to remove such impurities. One particularly suitable method of removing nitrogen impurities is to filter the oil while in liquid phase through a bed of adsorbent material. It has been further found that bauxite is particularly suitable for removing nitrogen impurities from oils. For example, blends containing 1 gram of pyridine or 1 gram of aniline for each liter of benzol were allowed to filter through a bed of bauxite. The first 15 volumes of filtrate filtered through one volume of bauxite were entirely free of nitrogen.

The following example serves to illustrate results obtained by filtering the oil to be cracked through a bed of bauxite.

A light East Texas gas oil was filtered through a bed of bauxite at room temperature. Inspections of the oil before and after the filtration are given in the following table:

Table I

| Feed stock, light E. T. G. O. | Filtered | Unfiltered |
|---|---|---|
| Per cent nitrogen (Kjeldahl) | 0.020 | 0.032 |
| Specific dispersion | 121 | 127 |
| Gravity, °A. P. I. | 34.2 | 33.2 |
| Aniline point, °F | 178 | 173 |
| 10% at °F | 545 | 546 |
| 50% at °F | 599 | 598 |
| Wt. % S | 0.26 | 0.29 |

The above analyses show that the filtration resulted in the reduction in the amount of nitrogen and sulfur contained in the oil. The increase in the aniline point and the corresponding reduction in specific dispersion also indicate the removal of certain aromatic constituents by the filtration treatment.

The effect of the filtration on the cracking characteristics of the oil was determined by passing portions of the oil before and after filtering through a bed of activated clay of the type known as Super Filtrol maintained at 850° F. at a feed rate of 0.6 volumes of oil per volume of catalyst per hour over two-hour cracking periods, followed by regeneration of the catalyst to remove combustible deposits formed thereon during the cracking operation.

The yields of products obtained on the oils before and after filtering are summerized in the following table:

Table II

| Product yields | Filtered | Unfiltered |
| --- | --- | --- |
| Vol. % gasoline | 48.8 | 41.5 |
| Wt. % wet gas | 2.3 | 2.3 |
| Wt. % coke | 3.1 | 3.5 |
| Gasoline/gas ratio | 21.2 | 18.0 |
| Gasoline/coke ratio | 15.8 | 11.8 |

From the above data it is clear that the filtering treatment results in higher yields of gasoline and lower yields of low-grade products, such as coke and gas, than are obtained without the initial filtering treatment. This is shown by the increase in gasoline-to-gas and gasoline-to-coke ratios shown in the above table.

While bauxite is the preferred filtering medium, other materials, such as alumina gel, activated alumina, activated clays and the like, may be employed in lieu thereof or in combination therewith. Furthermore, the filtration may be carried out at elevated temperature, such as temperatures up to the boiling point of the oil. It is preferred, however, to carry out the filtration in liquid phase.

Having described the preferred embodiment of the invention, it will be understood that it embraces such other variations and modifications as come within the spirit and scope thereof.

What is desired to be protected by Letters Patent is:

1. In a process for cracking crude hydrocarbon oils in the presence of an active catalyst wherein the oil contains objectionable nitrogenous base impurities which affect the yield and character of the products obtained by the catalytic cracking step; the method of reducing objectionable nitrogenous impurities contained in said oil which comprises passing said oil through a mass of an adsorptive material consisting principally of aluminum oxide.

2. The process defined in claim 1 wherein the adsorptive material comprises bauxite.

3. The process defined by claim 1 wherein the adsorptive material comprises activated alumina.

4. The process defined by claim 1 wherein the adsorptive material comprises alumina gel.

5. The process defined by claim 1 wherein the oil is contacted with said adsorptive material while at substantially room temperature.

6. A process for cracking crude hydrocarbon oils containing objectionable nitrogenous base impurities which comprises reducing the amount of objectionable nitrogenous impurities in said hydrocarbon oils by initially treating said oil with an adsorptive material consisting principally of aluminum oxide, thereafter passing the treated oil through a cracking zone maintained at active cracking temperature, contacting said oil within said cracking zone with an active cracking catalyst and thereafter fractionating the cracked products to segregate a motor fuel therefrom.

7. The process defined by claim 6 wherein the adsorptive material comprises bauxite.

PAUL E. KUHL.